United States Patent
Sylvester

(10) Patent No.: US 6,190,751 B1
(45) Date of Patent: Feb. 20, 2001

(54) SELF-ADHESIVE REINFORCED FOAM GASKET

(76) Inventor: Michael S. Sylvester, 31 Shoreby Dr., Bratenahl, OH (US) 44108

(*) Notice: Under 35 U.S.C. 154(b), the term of this patent shall be extended for 0 days.

(21) Appl. No.: 09/198,659

(22) Filed: Nov. 24, 1998

(51) Int. Cl.$^7$ ....................................... B32B 3/02
(52) U.S. Cl. ................... 428/66.4; 428/41.8; 428/317.1; 428/314.4; 428/319.3; 428/319.7; 428/343; 428/354; 156/78; 277/227; 277/228; 49/233; 49/279; 160/40; 160/41
(58) Field of Search ................................. 428/66.4, 41.8, 428/317.1, 314.4, 319.3, 319.7, 343, 354; 156/78; 277/227, 228, 233; 296/93; 49/479; 160/40

(56) References Cited

U.S. PATENT DOCUMENTS

| | | |
|---|---|---|
| 4,060,439 | 11/1977 | Rosemund et al. . |
| 4,136,203 | 1/1979 | Murphy et al. . |
| 4,175,154 | 11/1979 | Faust et al. . |
| 4,210,693 | 7/1980 | Regan et al. . |
| 4,234,647 * | 11/1980 | Murphy et al. ....................... 428/220 |
| 4,299,921 * | 11/1981 | Youssef ................................ 435/298 |
| 4,554,191 | 11/1985 | Korpman . |
| 4,567,091 * | 1/1986 | Spector ................................. 428/222 |
| 4,797,170 * | 1/1989 | Hoopengardner ....................... 156/71 |
| 4,839,206 | 6/1989 | Waldenberger . |
| 4,981,755 | 1/1991 | Cascino . |
| 4,990,399 * | 2/1991 | Hoopengardner ................. 428/317.3 |
| 5,330,814 * | 7/1994 | Fewell ................................... 428/41 |
| 5,372,865 | 12/1994 | Arakawa et al. . |
| 5,447,761 | 9/1995 | Lafond . |
| 5,476,618 | 12/1995 | Ito et al. . |
| 5,503,927 * | 4/1996 | Ragland et al. ....................... 428/353 |
| 5,629,085 * | 5/1997 | Ito et al. ............................. 428/318.6 |
| 5,658,630 * | 8/1997 | Shizukuda et al. ................. 428/40.1 |
| 5,695,870 * | 12/1997 | Kelch et al. ....................... 428/318.4 |
| 5,750,254 | 5/1998 | Starkey . |
| 6,013,342 * | 1/2000 | Neto ................................... 428/40.1 |

OTHER PUBLICATIONS

*Plastics Film Technology*, W.R.R. Park, editor, Van Nostrand Reinhold Co., prior to 1971, p. 59.

Letter (2 pages) dated Dec. 9, 1999, Re: FOAM–FIX Product: Notice of Prior Art, from Doreen J. Gridley to Michael Sylvester with four pages of enclosures.

*Vinyl (PVC) Foam Standard Log Prices*, from Gaska Tape, Inc., p. 8.

*EN1101W15: Gaska Tape Product Defaults (Typical Makeup)*, from Gaska Tape, Inc., dated Jan. 25, 1997, 1 page.

* cited by examiner

Primary Examiner—Terrel Morris
Assistant Examiner—Arti Singh
(74) Attorney, Agent, or Firm—Pearne & Gordon LLP

(57) ABSTRACT

A self-adhesive reinforced foam gasket comprising a release liner having an upper surface which is a release surface, a layer of pressure sensitive adhesive applied to the release surface, a layer of flexible polymeric film, preferably polyester film, applied to the pressure sensitive adhesive layer, and a layer of flexible foam, preferably closed cell PVC flexible foam, thermally bonded to the flexible polymeric film layer. A length of material for die-cutting the gasket therefrom is provided. The gasket may be used in automobiles and other applications.

20 Claims, 1 Drawing Sheet

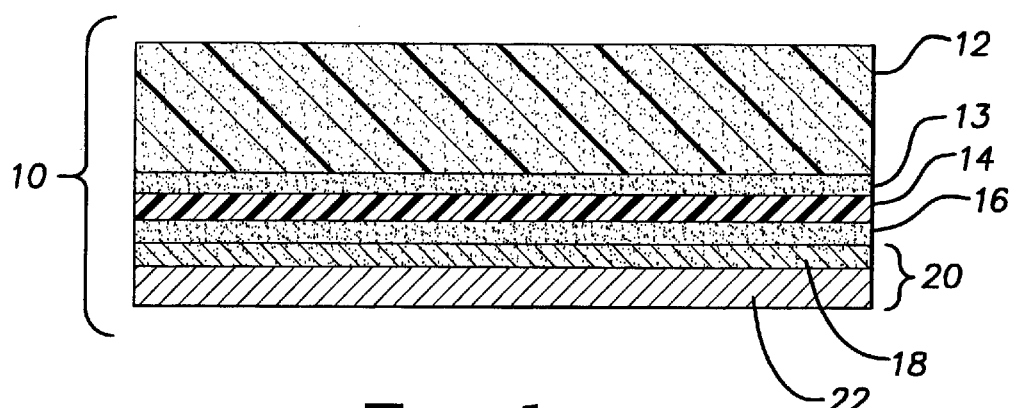
FIG. 1
(PRIOR ART)
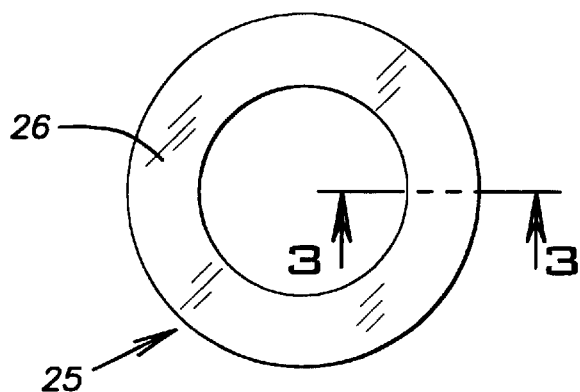 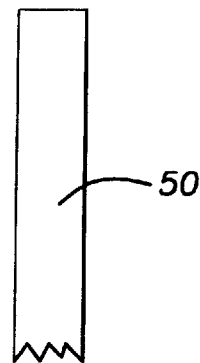
FIG. 2  FIG. 4
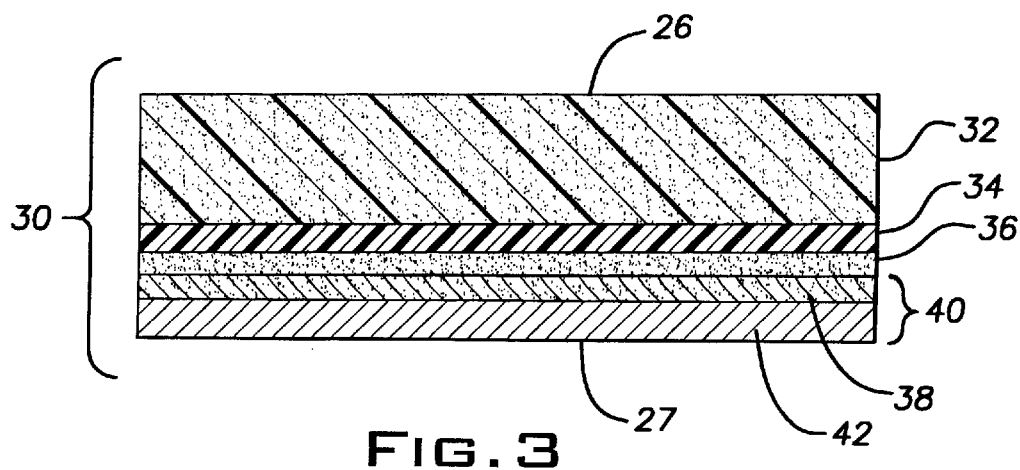
FIG. 3

SELF-ADHESIVE REINFORCED FOAM GASKET

FIELD OF THE INVENTION

The invention relates generally to foam gaskets and more particularly to a self-adhesive reinforced foam gasket.

DESCRIPTION OF RELATED ART

Common weatherstripping for use in the home is well-known. This product is frequently a thick but narrow layer or strip of closed cell plastic flexible foam with a layer of pressure sensitive adhesive on one surface protected by a release liner. The release liner is removed and the weatherstripping is adhered or stuck around a door frame, a window frame, etc. to seal out wind, noise and moisture. This weatherstripping with adhesive and release liner is frequently produced in a very wide sheet (such as 5 feet wide) which is coiled up and slit into a series of thin coils for sale to the consumer. It is believed that in the auto industry it has been known to take a five foot wide sheet of this weatherstripping material, slit it and die cut gaskets in circles, rectangles, etc. for use as a self-adhesive non-reinforced foam gasket in automotive applications such as seals around interior audio speakers, seals around cut-outs in the dash for air conditioning ducting, etc. One problem is that this product easily stretches or distorts during the application process and the fit is poor or imperfect.

To address this problem a prior art product as illustrated in FIG. 1 has been used in the auto industry. FIG. 1 shows a self-adhesive reinforced foam gasket 10 comprising a thick layer of closed cell PVC flexible foam 12, a layer of pressure sensitive adhesive 13, a layer of flexible polyester film 14 (such as Mylar), a layer of pressure sensitive adhesive 16, and a release liner 20 comprised of release paper 22 with a silicone release coating 18.

This product has been produced in wide, approximately five foot, sheets by providing a release liner 20 having a release surface provided by release coating 18, to which is applied a layer of pressure sensitive adhesive 16. A layer of polyester film 14 is then applied to the pressure sensitive adhesive layer 16. On top of polyester film layer 14 is applied pressure sensitive adhesive layer 13, to which is laminated, at room temperature, a previously produced thick layer of closed cell PVC foam 12. In the prior art this product was then die-cut to provide reinforced self-adhesive foam gaskets which were used in the auto industry generally as described above. The polyester film layer prevented the stretching which was a problem with the conventional weatherstripping. The problem with this polyester film-reinforced product is that it is expensive and laborious to produce, and the closed cell PVC foam layer 12 is attached to the polyester film layer 14 by a layer of pressure sensitive adhesive 13, which is not a sufficiently secure way to attach the closed cell PVC foam layer to the polyester film layer. Also, plasticizer in the PVC foam layer 12 tends to bleed through to the adhesive layer 13 and degrade and turn gummy the pressure sensitive adhesive layer 13.

There is a need for a self-adhesive reinforced foam gasket which overcomes the deficiencies in the prior art and a method to produce such an improved product.

SUMMARY OF THE INVENTION

A self-adhesive reinforced foam gasket is provided, comprising a release liner having an upper surface which is a release surface, a layer of pressure sensitive adhesive applied to the release surface, a layer of flexible polymeric film applied to the pressure sensitive adhesive layer, and a layer of flexible foam thermally bonded to the flexible polymeric film layer. The gasket has a shape such that it may be used effectively as a self-adhesive foam gasket. A length of material suitable for die-cutting a self-adhesive reinforced foam gasket therefrom is also provided. The material comprises a release liner having an upper surface which is a release surface, a layer of pressure sensitive adhesive applied to the release surface, a layer of flexible polymeric film applied to the pressure sensitive adhesive layer, and a layer of flexible foam thermally bonded to the flexible polymeric film layer. The length of material is at least 8 inches wide and 20 feet long. A method of making the length of material is also provided.

BRIEF DESCRIPTION OF THE DRAWINGS

FIG. 1 is a schematic, cross-sectional view of a prior art self-adhesive reinforced foam gasket.

FIG. 2 is a top view of a self-adhesive reinforced foam gasket of the present invention.

FIG. 3 is a schematic, cross-sectional view of the gasket of FIG. 2 taken along line 3—3.

FIG. 4 is a top or plan view of a length of material according to the invention.

DETAILED DESCRIPTION OF THE PREFERRED EMBODIMENTS OF THE INVENTION

As used herein, parts are parts by weight and percents are weight percents unless otherwise indicated or apparent. When a preferred range such as 5–25 is given, this means preferably at least 5 and preferably not more than 25.

With reference to FIG. 2 there is shown a top or plan view of a self-adhesive reinforced foam gasket 25 of the present invention having a top surface 26, which is the top surface of the flexible foam layer 32 shown in FIG. 3. Gasket 25 is shown as circular, but it can be any other shape as known in the art, particularly the shapes used in automotive applications.

With reference to FIG. 3 there is shown in cross-section a self-adhesive reinforced foam gasket 30 of the present invention. Gasket 30 comprises a release liner 40 comprising release paper 42 having a release (preferably silicone) coating 38 which provides a release surface. Thus release liner 40 has an upper surface which is a release surface. The release paper is preferably 40–160 lb., more preferably 60–100 lb., more preferably about 78 lb., clay-coated, long-fiber, super-calandered, flat, heat resistant paper as known in the art. Plastic or polymeric film may be substituted for paper layer 42. A layer of pressure sensitive adhesive 36 is applied to the release surface of the silicone release coating 38. The pressure sensitive adhesive (PSA) layer 36 is preferably a high-temperature rubber-based hot melt pressure sensitive adhesive such as from Monsanto or National Starch that is heated so that it can be extruded onto the release liner. Other pressure sensitive adhesives, particularly high-temperature PSAs, known in the art can be used, such as PSAs which are 100% solids (such as silicone-based) and PSAs which have a solvent carrier which is preferably an organic liquid, less preferably water, which is evaporated after the PSA layer is applied. PSA layer 36 is preferably 0.5–5, more preferable 1–3, more preferably about 2, mils thick. The PSA is selected such that it can withstand the heating process described hereinafter and can effectively bond to the intended substrate, which is preferably a part of an automobile, commonly a plastic part of an automobile.

Next, a layer of flexible polymeric film 34, preferably polyester film, is applied to the PSA layer 36. Flexible polymeric film layer 34 is preferably 0.5–4, more preferably 0.7–2, more preferably 0.8–1.5, more preferably about 1, mil thick polyester film (preferably nontreated), such as Mylar brand polyester film from DuPont. Other flexible polymeric films having the strength, flexibility and temperature resistance of Mylar may also be used, such as PET polymeric film, polyvinylidene chloride polymeric film, polyacrylic film, polyvinyl chloride film, polyvinyl acetate film, polyamide film, and polyimide film. Flexible polymeric film layer 34 provides reinforcement to the gasket and prevents migration of plasticizer from flexible foam layer 32 to pressure sensitive adhesive layer 36, where it would adversely affect and degrade the PSA.

To the polymeric film layer 34 is thermally bonded a layer of flexible foam 32, preferably closed cell PVC flexible foam, less preferably other PVC foams such as lower temperature PVC foams and polymeric PVC foams, alternatively other flexible foams such as polyurethane foam, polyethylene foam, other vinyl foams, and polypropylene foam. After curing and solidifying, the flexible foam layer 32 is preferably 1/32 to 1 inch thick, more, preferably 1/16 to 3/4 inch thick, more preferably 1/8 to 1/2 inch thick, more preferably 3/16 to 1/4 inch thick.

The pressure sensitive adhesive layer 36 is applied to the release surface of the release liner 40 in a conventional manner, such as by slot die extrusion. The polymeric film layer 34 is then laminated or applied and adhered to the PSA layer 36 in a conventional manner. Preferably, the flexible foam layer 32 is then provided and thermally bonded to the polymeric film layer 34 by providing the flexible foam in a liquid, uncured state (with blowing agent) on the polymeric film in a relatively thin layer and then heating or baking the material in an oven to activate the blowing agent, expand and cure the flexible foam and simultaneously thermally bond the flexible foam to the polymeric film 34.

A preferred flexible plastic or polymeric foam is closed cell PVC foam, made of about 34 parts PVC dispersion resin such as Kaneka Prod. No. EH219, about 8 parts PVC blending resin such as Kaneka Prod. No. PBM B5F, about 39 parts phthalate plasticizer (88% phthalate plasticizer, 12% chlorinated paraffin), about 14 parts $CaCO_3$ filler, about 4 parts azodicarbonamide blowing agent, about 0.5 parts cell stabilizer such as Product VS103 from Air Products, about 0.5 parts heat stabilizer such as a zinc blend such as Ferro Prod. 5573, and about 0.5 parts epoxidized soybean oil plasticizer. Less preferably these amounts may be changed ±10%. Other components and optional ingredients known in the art may also be used. Substitute components known in the art may be used.

The expanded and cured flexible foam or PVC flexible foam preferably has a density of 5 to 5.5 to 6 to 7 to 8 to 9 to 10 to 12 to 15 to 20 $lb/ft^3$ more preferably 6–8 or 7–8 $lb/ft^3$. The flexible foam and PVC flexible foam preferably meets or exceeds the following requirements or specifications which are known in the art: GM 6086M Type 1A, GM 6086 Type 1B, GM 6086 II, MSAY-505, MS-AY511, ESB-M3G101-A Type 1, ESB-M3G77-A, and ESB-M3G102-A.

With reference to the preferred PVC formulation above, at room temperature the liquids are mixed and the powders are then blended in to yield a PVC plastisol, which is a liquid flexible foam precursor including a blowing agent. The substrate, which is the release liner 40 with PSA layer 36 and polymeric film layer 34, is provided in a sheet preferably about 5 feet wide (less preferably at least 4, 3, 2 or 1 foot wide) and preferably at least 20, 50, 100, 200 or 300 feet long, rolled up. The substrate is slowly unrolled and the liquid PVC plastisol or flexible foam precursor with blowing agent, at room temperature, is cast or transferred or applied or provided in an appropriate thickness or layer to the polymeric film surface with a knife or similar coater. The substrate with PVC plastisol or flexible foam precursor is then transported into an oven where it is heated or baked at preferably about 400° F., less preferably about 380–420° F., for preferably about 3.5 min., less preferably about 3 to 4 minutes, to activate the blowing agent, to expand and cure the precursor and solidify the flexible foam and thermally bond it to the polymeric film layer 34. This operation yields a cured flexible foam layer which is thermally bonded to the polymeric film layer. If other liquid plastisols or flexible polymeric foam precursors are applied to the polymeric film surface, the time and temperature parameters are adjusted as known in the art to effectively expand and cure the flexible foam and thermally bond it to the polymeric film. The product is then removed from the oven and permitted to cool to room temperature. As a result of this operation the flexible foam layer is thermally bonded to the polymeric film layer.

As a result of the above procedure, the top surface 26 of the flexible foam will have an "as cast" appearance. This top surface 26 is not an adhesive surface and is produced such that it will not stick to other surfaces. If through some error top surface 26 is tacky or sticky, a release coating such as silicone may be applied thereto or to the bottom surface 27 of release liner 40 to permit the product to be rolled or coiled up. The thermal bond between the flexible foam 32 and the polymeric film 34 is preferably such that the flexible foam itself will tear before the thermal bond will yield. Thus the bond strength is greater than the tear strength or tensile strength of the flexible foam.

The product is preferably produced as a sheet or length of material 50 (as shown in FIG. 4) about 5 feet wide and about or at least 20 to 50 to 100 to 200 to 300 feet long, depending on the thickness of the product, which length of material is suitable for die-cutting a self-adhesive reinforced foam gasket therefrom. The product or length of material 50 is rolled up, typically into a roll or coil 2–3 feet in diameter. Thus the thicker the material, usually the shorter the length, so that the preferred diameter of the roll or coil is not exceeded. The rolls or coils of the product are then provided to a die-cutting operation which die cuts the gaskets therefrom. The product may be slit and provided to the die-cutting operation in rolls less than 5, 4, 3, 2 or 1 feet wide, sometimes as narrow as 8–10 inches wide (thus at least 8 or 10 inches or 1, 2, 3 or 4 feet wide). The die-cutting operation produces via a conventional die-cutting procedure a die-cut self-adhesive reinforced foam gasket, preferably for the automotive industry, such as a gasket for inside the glove box, for the outside mirror, around where the seat belt attaches to the floor, as a seal around the top of the fuel tank filling tube, around audio speakers in the front and back of the car, around cut-outs in the dash for air conditioning ducting, around the inside of the door, to act as a secondary seal around the opera window, and to act as a secondary seal around the trunk lid. It is also known in the art other places on the automobile where self-adhesive foam gaskets such as described herein are used. As is apparent, the invented gasket material can be used in similar gasket applications outside the automotive industry. These gaskets principally cushion and seal against wind, noise and moisture.

These gaskets may be shaped as circles (see FIG. 2), squares, rectangles, figure-eights, and all sorts of other shapes known in the art, typically with most of the central area cut out leaving a perimeter wall typically 1/8 to 1/4 to 1/2 to 3/4 to 1 to 2 to 4 inches wide (which may or may not have cut out holes for fasteners). Alternatively the gasket may have only small cut outs for bolt or screw or fastener holes etc. Alternatively the gasket may be a strip 1/8 to 1/4 to 1/2 to 3/4 to 1 to 2 to 4 inches wide with or without cut out holes for fasteners, etc.

To apply the gasket, the release liner is removed and the gasket is applied and pressed into position.

Although particular embodiments of the invention have been described in detail, it is understood that the invention is not limited correspondingly in scope, but includes all changes and modifications coming within the spirit and terms of the claims appended hereto.

What is claimed is:

1. A self-adhesive reinforced foam gasket comprising a release liner having an upper surface which is a release surface, a layer of pressure sensitive adhesive applied to said release surface, a layer of flexible polymeric film applied to said pressure sensitive adhesive layer, a layer of flexible foam thermally bonded to said flexible polymeric film layer, said flexible polymeric film layer and said flexible foam layer being separate, distinct layers made of different materials, said gasket having a shape such that said gasket may be used effectively as a self-adhesive foam gasket.

2. A gasket according to claim 1, wherein said flexible polymeric film is polyester film.

3. A gasket according to claim 1, wherein said flexible foam is polyvinyl chloride flexible foam.

4. A gasket according to claim 3, wherein said polyvinyl chloride flexible foam is closed cell polyvinyl chloride flexible foam.

5. A gasket according to claim 4, said closed cell polyvinyl chloride flexible foam having a density of 5 to 20 lb/ft$^3$.

6. A gasket according to claim 5, said flexible polymeric film being polyester film, said layer of flexible foam being 1/16 to 3/4 inch thick, said gasket being a die-cut gasket.

7. A gasket according to claim 6, wherein said pressure sensitive adhesive is a high-temperature hot melt pressure sensitive adhesive.

8. A gasket according to claim 1, said gasket being a die-cut gasket.

9. A gasket according to claim 1, said layer of flexible foam being 1/16 to 3/4 inch thick.

10. A gasket according to claim 1, said flexible polymeric film layer being 0.5 to 4 mils thick.

11. A gasket according to claim 1, said gasket consisting essentially of said release liner, said layer of pressure sensitive adhesive, said layer of flexible polymeric film, and said layer of flexible foam.

12. A gasket according to claim 7, said gasket consisting of said release liner, said layer of pressure sensitive adhesive, said layer of flexible polymeric film, and said layer of flexible foam.

13. A length of material suitable for die-cutting a self-adhesive reinforced foam gasket therefrom, said material comprising a release liner having an upper surface which is a release surface, a layer of pressure sensitive adhesive applied to said release surface, a layer of flexible polymeric film applied to said pressure sensitive adhesive layer, a layer of flexible foam thermally bonded to said flexible polymeric film layer, said flexible polymeric film layer and said flexible foam layer being separate, distinct layers made of different materials, said length of material being at least eight inches wide and at least twenty feet long and being suitable for die-cutting a self-adhesive reinforced foam gasket therefrom.

14. A length of material according to claim 13, said length of material being at least one foot wide and at least fifty feet long.

15. A length of material according to claim 13, wherein said flexible polymeric film is polyester film.

16. A length of material according to claim 13, wherein said flexible foam is closed cell polyvinyl chloride flexible foam.

17. A length of material according to claim 13, said layer of flexible foam being 1/16 to 3/4 inch thick.

18. A length of material according to claim 13, said flexible foam having a density of 5 to 20 lb/ft$^3$.

19. A gasket according to claim 1, wherein said pressure sensitive adhesive is a high-temperature pressure sensitive adhesive.

20. A gasket according to claim 1, wherein the flexible foam will tear before the thermal bond will yield.

* * * * *